(12) United States Patent
Goff et al.

(10) Patent No.: US 7,417,599 B2
(45) Date of Patent: *Aug. 26, 2008

(54) MULTI-LOOP ANTENNA FOR RADIO FREQUENCY IDENTIFICATION (RFID) COMMUNICATION

(75) Inventors: Edward D. Goff, Mahtomedi, MN (US); Seth A. Lieffort, Eagan, MN (US); Leroy Stolberg, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 505 days.

This patent is subject to a terminal disclaimer.

(21) Appl. No.: 10/784,124

(22) Filed: Feb. 20, 2004

(65) Prior Publication Data

US 2004/0183742 A1 Sep. 23, 2004

(51) Int. Cl.
*H01Q 21/00* (2006.01)
(52) U.S. Cl. ............ 343/867; 343/742; 340/572.7
(58) Field of Classification Search .......... 343/741, 343/742, 866, 867, 895; 340/825.36, 572.7, 340/572.5, 572.1; 235/451, 492
See application file for complete search history.

(56) References Cited

U.S. PATENT DOCUMENTS

| | | | | |
|---|---|---|---|---|
| 4,243,980 A | * | 1/1981 | Lichtblau | 340/572.7 |
| 4,260,990 A | * | 4/1981 | Lichtblau | 343/742 |
| 4,326,198 A | * | 4/1982 | Novikoff | 340/572.2 |
| 4,782,345 A | | 11/1988 | Landt | |
| 5,103,234 A | * | 4/1992 | Watkins et al. | 343/742 |
| 5,126,749 A | * | 6/1992 | Kaltner | 343/742 |
| 5,142,292 A | | 8/1992 | Chang | |
| 5,337,063 A | * | 8/1994 | Takahira | 343/741 |
| 5,608,417 A | * | 3/1997 | de Vall | 343/895 |
| 5,914,692 A | * | 6/1999 | Bowers et al. | 343/742 |
| 5,926,093 A | | 7/1999 | Bowers et al. | |
| 5,940,043 A | | 8/1999 | Canipe et al. | |
| 5,963,173 A | * | 10/1999 | Lian et al. | 343/742 |
| 5,977,875 A | | 11/1999 | Lin et al. | |
| 6,037,879 A | | 3/2000 | Tuttle | |
| 6,043,792 A | | 3/2000 | Finlayson | |

(Continued)

FOREIGN PATENT DOCUMENTS

EP 0 766 200 4/1997

(Continued)

OTHER PUBLICATIONS

Carr, Joseph J., "Practical Antenna Handbook," 3rd Edition, pp. 291-297 and 307-309, 1998.

(Continued)

*Primary Examiner*—Tan Ho
(74) *Attorney, Agent, or Firm*—John A. Burtis

(57) ABSTRACT

A multi-loop antenna is described having a plurality of conductive loops to produce an electromagnetic field for radio frequency identification (RFID) communication with RFID tags. The conductive loops are spaced apart at least a distance that is selected based on a dimension of the RFID tags with which the antenna communicates. In this manner, the loops are positioned and spaced in a manner that reduces the size of the holes within the resulting magnetic field. In addition, the configuration of the described dual-loop antenna increases the coverage of the antenna, and decreases inter-winding capacitance, thereby increasing overall read range achieved by the antenna.

29 Claims, 8 Drawing Sheets

U.S. PATENT DOCUMENTS

| | | | |
|---|---|---|---|
| 6,107,920 A | 8/2000 | Eberhardt et al. | |
| 6,127,989 A * | 10/2000 | Kunz | 343/895 |
| 6,147,655 A * | 11/2000 | Roesner | 343/741 |
| 6,164,551 A | 12/2000 | Altwasser | |
| 6,396,341 B1 | 5/2002 | Pehlke | |
| 6,459,588 B1 | 10/2002 | Morizumi et al. | |
| 6,522,308 B1 | 2/2003 | Mathieu | |
| 6,567,050 B1 * | 5/2003 | Briggs | 343/741 |
| 6,714,121 B1 * | 3/2004 | Moore | 340/10.3 |
| 6,814,284 B2 * | 11/2004 | Ehlers et al. | 235/383 |
| 6,839,035 B1 * | 1/2005 | Addonisio et al. | 343/742 |
| 6,861,993 B2 * | 3/2005 | Waldner | 343/742 |
| 2002/0180588 A1 | 12/2002 | Erickson et al. | |
| 2002/0196126 A1 | 12/2002 | Eisenberg et al. | |
| 2004/0164864 A1 | 8/2004 | Chung et al. | |
| 2005/0110641 A1 | 5/2005 | Mendolia et al. | |

FOREIGN PATENT DOCUMENTS

| | | |
|---|---|---|
| EP | 0 829 921 B1 | 6/2001 |
| EP | 1 128 464 A1 | 8/2001 |
| EP | 1 229 482 | 8/2002 |
| FR | 2 745 928 | 9/1997 |
| FR | 2 808 127 | 10/2001 |
| JP | 06-076185 | 3/1994 |
| JP | 2000-162314 | 6/2000 |
| WO | 98/05088 | 2/1998 |
| WO | 98/31070 | 7/1998 |

OTHER PUBLICATIONS

The ARRL Handbook for Radio Amateurs—The Standard in Applied Electronics and Communications, 2001, pp. 20.36-20.39 and 20.68-20.69, 2000.

"Field-Shaping Shielding For Radio Frequency Identification (RFID) System", filed Feb. 20, 2004, U.S. Appl. No. 10/784,109.

"Multi-Loop Antenna For Radio-Frequency Identification", filed Mar. 3, 2003, U.S. Appl. No. 10/378,458.

* cited by examiner

MULTI-LOOP ANTENNA FOR RADIO FREQUENCY IDENTIFICATION (RFID) COMMUNICATION

TECHNICAL FIELD

The invention relates to radio frequency identification (RFID) systems for article management.

BACKGROUND

Radio-Frequency Identification (RFID) technology has become widely used in virtually every industry, including transportation, manufacturing, waste management, postal tracking, airline baggage reconciliation, and highway toll management. A typical RFID system includes a plurality of RFID tags, at least one RFID reader or detection system having an antenna for communication with the RFID tags, and a computing device to control the RFID reader. The RFID reader includes a transmitter that may provide energy or information to the tags, and a receiver to receive identity and other information from the tags. The computing device processes the information obtained by the RFID reader.

In general, the information received from an RFID tag is specific to the particular application, but often provides an identification for an article to which the tag is fixed. Exemplary articles include manufactured items, books, files, animals or individuals, or virtually any other tangible articles. Additional information may also be provided for the article. The tag may be used during a manufacturing process, for example, to indicate a paint color of an automobile chassis during manufacturing or other useful information.

The transmitter of the RFID reader outputs RF signals through the antenna to create an electromagnetic field that enables the tags to return an RF signal carrying the information. In some configurations, the transmitter initiates communication, and makes use of an amplifier to drive the antenna with a modulated output signal to communicate with the RFID tag. In other configurations, the RFID tag receives a continuous wave signal from the RFID reader and initiates communication by responding immediately with its information.

A conventional tag may be an "active" tag that includes an internal power source, or a "passive" tag that is energized by the field created by the RFID reader. In either case, the tags communicate using a pre-defined protocol, allowing the RFID reader to receive information from one or more tags. The computing device serves as an information management system by receiving the information from the RFID reader and performing some action, such as updating a database. In addition, the computing device may serve as a mechanism for programming data into the tags via the transmitter.

Conventional antennas for RFID readers have a single inductive loop and operate in a relatively high frequency range, e.g., 3 megahertz (MHz) to 30 MHz. Consequently, these antennas tend to create magnetic fields that suffer from "holes," i.e., regions in which an RFID tag cannot be read even though the RFID tag is located relatively near the antenna. For example, depending on the orientation and location of the article to which the RFID tag is affixed, in some situations the RFID tag may be centered above a single turn of the inductive loop of the antenna during interrogation. In this situation, substantially equal current may be imposed on opposite sides of the RFID tag, which leads to a cancellation effect. As a result, the RFID tag may not be able to achieve RFID communication with the reader.

In addition, conventional antennas used with desktop RFID readers tend to create magnetic fields that extend horizontally beyond the edges of the antennas. Consequently, articles placed proximate the antenna, e.g., next to the antenna on the desktop, may be inadvertently read by the reader, which can lead to undesired results. For example, books associated with one library patron and located next to an antenna in a library management system may be inadvertently checked out to another patron.

SUMMARY

In general, a field-shaping antenna and shielding component are described that shape the magnetic field into a desirable configuration for use in an RFID system. More specifically, a dual-loop antenna is described in which the loops are positioned and spaced in a manner that reduces the size of the holes within the resulting magnetic field. In addition, the configuration of the described dual-loop antenna achieves increased field size relative to a single loop antenna with equivalent power and decreases inter-winding capacitance, thereby increasing overall read range achieved by the antenna.

In addition, a conductive shield is described that further refines and shapes the magnetic field produced by the antenna. For example, the antenna may be positioned substantially horizontally on a desktop or countertop. The conductive shield may be oriented parallel to the plane of the antenna, including located in the same plane as the antenna, and generally surrounding the antenna to limit the extent to which the electromagnetic field extends horizontally beyond the edges of the antenna. As a result, an electromagnetic field is produced that generally projects above and below the antenna, thus defining a generally vertical communication zone in which RFID tags can be read.

In one embodiment, a multi-loop antenna comprises a plurality of conductive loops to produce an electromagnetic field for radio frequency identification (RFID) communication with RFID tags. The conductive loops are spaced apart at least a distance that is selected based on a dimension of the RFID tags with which the antenna communicates.

In another embodiment, a radio frequency identification (RFID) system comprises an RFID tag associated with an article, and an antenna having a plurality of conductive loops to produce an electromagnetic field for communication with the RFID tag. The conductive loops are spaced at least a distance that is selected based at least in part on a dimension of the RFID tag.

In another embodiment, a radio frequency identification (RFID) system comprises an antenna that forms an electromagnetic field for communication with RFID tags, wherein the antenna has a substantially planar form. A substantially-contiguous conductive shield is positioned around the antenna and within a plane parallel to the antenna.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
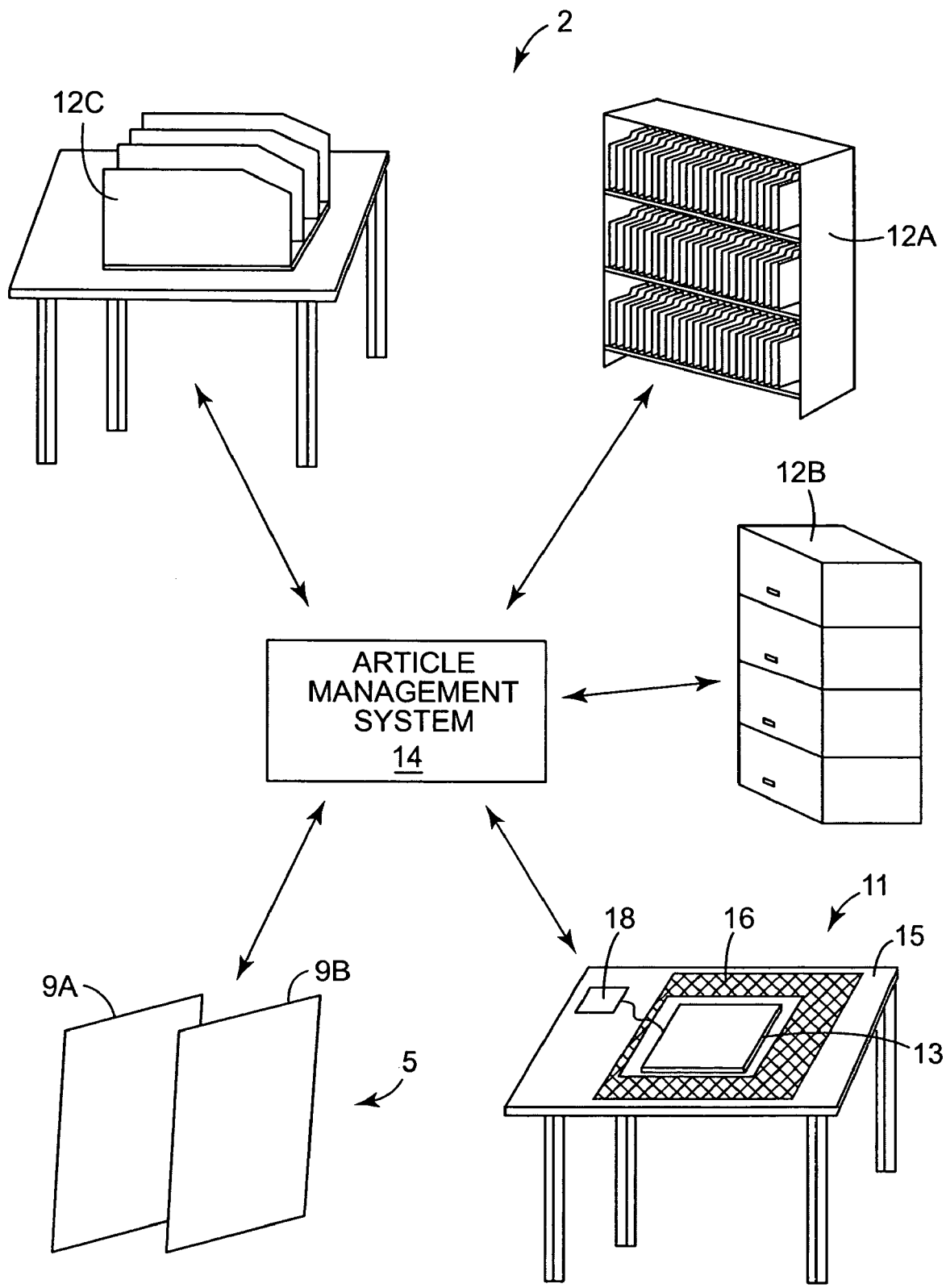
FIG. 1 is a block diagram illustrating an exemplary RFID system 2 that incorporates the techniques described herein.

FIG. 1 is a block diagram illustrating an exemplary RFID system 2 that incorporates the techniques described herein. In the illustrated example of FIG. 1, RFID system 2 is used to track books, document, files or other articles. The RFID system may, for example, be deployed within libraries, law offices, government agencies, or other facilities that generate and/or store documents and files, such as business, criminal, and medical records. The articles contain RFID tags that uniquely identify the articles. In addition, each RFID tag may also contain information describing the article, and status information indicating whether removal of the article is authorized. The RFID tags may be embedded within the articles so that the tags are substantially imperceptible, thereby reducing or prevent tampering.

In general, RFID system 2 operates within a frequency range of the electromagnetic spectrum, such as 13.56 MHz, with an allowable frequency variance of +/−7 kHz. However, other frequencies may be used for RFID applications, and the invention is not so limited. For example, some RFID systems in large storage areas such as a warehouse may use an RFID system that operates at approximately 900 MHz.

As illustrated in FIG. 1, system 2 includes an exit control system 5 that detects unauthorized removal of articles from a protected area. For example, the protected area may be a library and the articles may be books or other articles that are generally checked out from and back into the library. The techniques could also be applied to other kinds of articles without departing from the scope of the present invention.

Exit control system 5 includes lattices 9A and 9B which define an interrogation zone or corridor located near the exit of protected area. The lattices 9A and 9B include antennas for interrogating the RFID tags as they pass through the corridor to determine whether removal of the item to which the tag is attached is authorized. Exit control system 5 may utilize at least one RFID reader (not shown) to drive the antennas. To detect a tag, the RF reader outputs RF power through the antennas to create an electromagnetic field within the interrogation corridor. In general, the terms "electromagnetic field" and "magnetic field" are used interchangeably herein as the magnetic component is used to couple with the RFID tags.

The RF reader receives information from any tags present within the interrogation corridor, and exit control system 5 determines whether removal of the article is authorized. If removal of the article is not authorized, exit control system 5 initiates some appropriate security action, such as sounding an audible alarm, locking an exit gate, etc.

In addition, RFID system 2 includes a check-in/check-out area 11 by which an authorized person, e.g., a library patron or staff member, processes articles for removal or return. In particular, check-in/check-out area 11 includes an RFID reader 18 for interrogating RFID tags fixed to articles and changing their status as desired, e.g., checking-in or checking-out the articles.

In addition, articles may be positioned in a number of storage areas 12, e.g., on an open shelf 12A, a cabinet 12B, a vertical file separator 12C or a other location, as shown in FIG. 1. Each smart storage area 12 includes tag interrogation capability which enables tracking of articles throughout a facility. In a library setting, for example, a book could be tracked after check-in while on shelf 12A.

The RFID tags themselves may take any number of forms without departing from the scope of the present invention. Examples of commercially available RFID tags include 3M™ RFID tags available from 3M Company, St. Paul, Minn., or "Tag-it" RFID transponders available from Texas Instruments, Dallas, Tex. An RFID tag typically includes an integrated circuit operatively connected to an antenna that receives RF energy from a source and backscatters RF energy in a manner well known in the art. The RFID tag modulates the RF energy providing a backscattered signal to communicate information about the RFID tag and its associated article.

An article management system 14 provides a centralized database of the tag information for each article in the facility. Article management system 14 may be networked or otherwise coupled to one or more computers so that individuals, such as a librarian, at various locations, can access data relative to those items. For example, a user may request the location and status of a particular article, such as a book. Article management system 14 may retrieve the article information from a database, and report to the user the last location at which the article was located within one of the smart storage areas. Optionally, article management system 14 can re-poll or otherwise re-acquire the current location of an article to verify that the article is in the location indicated in the database.

As described in further detail below, RFID system 2 incorporates the techniques described herein. Check-in/check-out area 11 and RFID reader 18, for example, may incorporate a field-shaping dual-loop antenna 13 and a conductive shield 16 that produce a magnetic field in a desirable configuration. For example, RFID reader 18 may incorporate dual-loop antenna 13 described herein in which the loops are positioned and spaced in a manner that reduces the size of the holes within the resulting magnetic field. In addition, the configuration of the described dual-loop antenna 13 achieves increased field size relative to a single loop antenna with equivalent power and decreases inter-winding capacitance, thereby increasing overall read range achieved by RFID reader 18.

In addition, check-in/check-out area 11 may utilize a conductive shield 16 to further refine and shape the magnetic field produced by antenna 13. For example, as illustrated, antenna 13 may be mounted substantially horizontally on, within, or below desktop 15. Conductive shield 16 may be located planar to and generally surrounding antenna 13 to prevent the electromagnetic field from extending horizontally beyond the edges of the antenna. As a result, an electromagnetic field is produced that generally projects above and below antenna 13, thus defining a generally vertical communication zone in which RFID tags can be read. Conductive shield 16 may be mounted on desktop 15, or below or within the desktop out of view from library patrons and staff. Conductive shield 16 need not necessarily be electrically grounded to shape the magnetic field as described herein.

Figure 2:
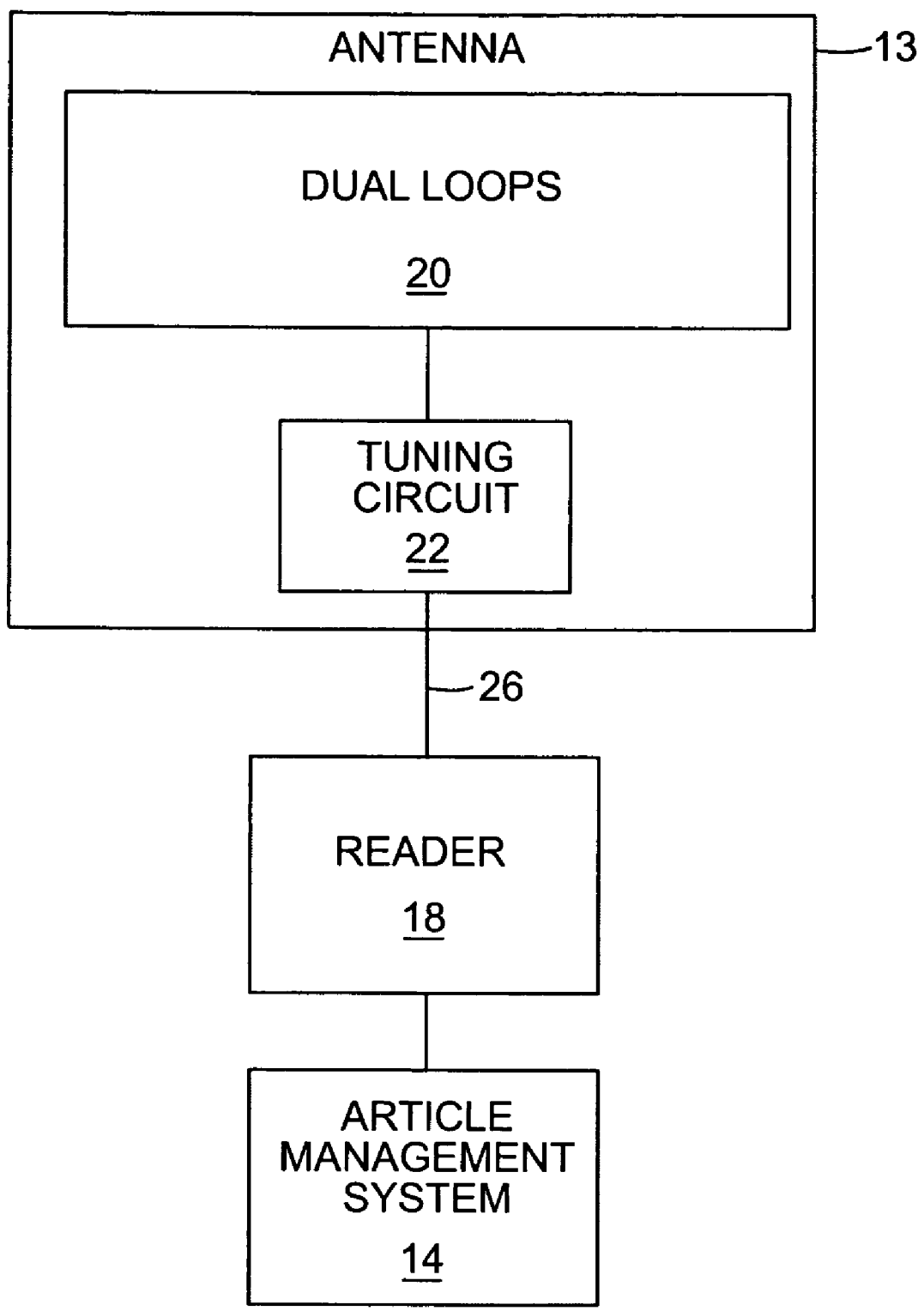
FIG. 2 is a block diagram that further illustrates on embodiment of an antenna of the RFID system of FIG. 1.

FIG. 2 is a block diagram that further illustrates antenna 13. As illustrated, antenna 13 generally includes dual loops 20 that, as described in further detail below, are positioned and spaced in a manner that reduces the size of the holes within the resulting magnetic field and achieves increased field size and strength. Although discussed generally as having dual loops, antenna 13 may have additional loops that are spaced based on the desired size of the tag communication zone as well as the dimensions of the individual tags.

Tuning circuit 22 tunes dual loops 20 to a resonant frequency, and provides impedance matching and signal conversion between the loop structure and cable 26, which may be a co-axial cable. Reader 18 is coupled to tuning circuit 22 via cable 26 and utilizes antenna 13 for both RFID transmit and receive operations. Consequently, reader 18 may include a directional coupler to interpret the signal returned from tuning circuit 22.

Figure 3:
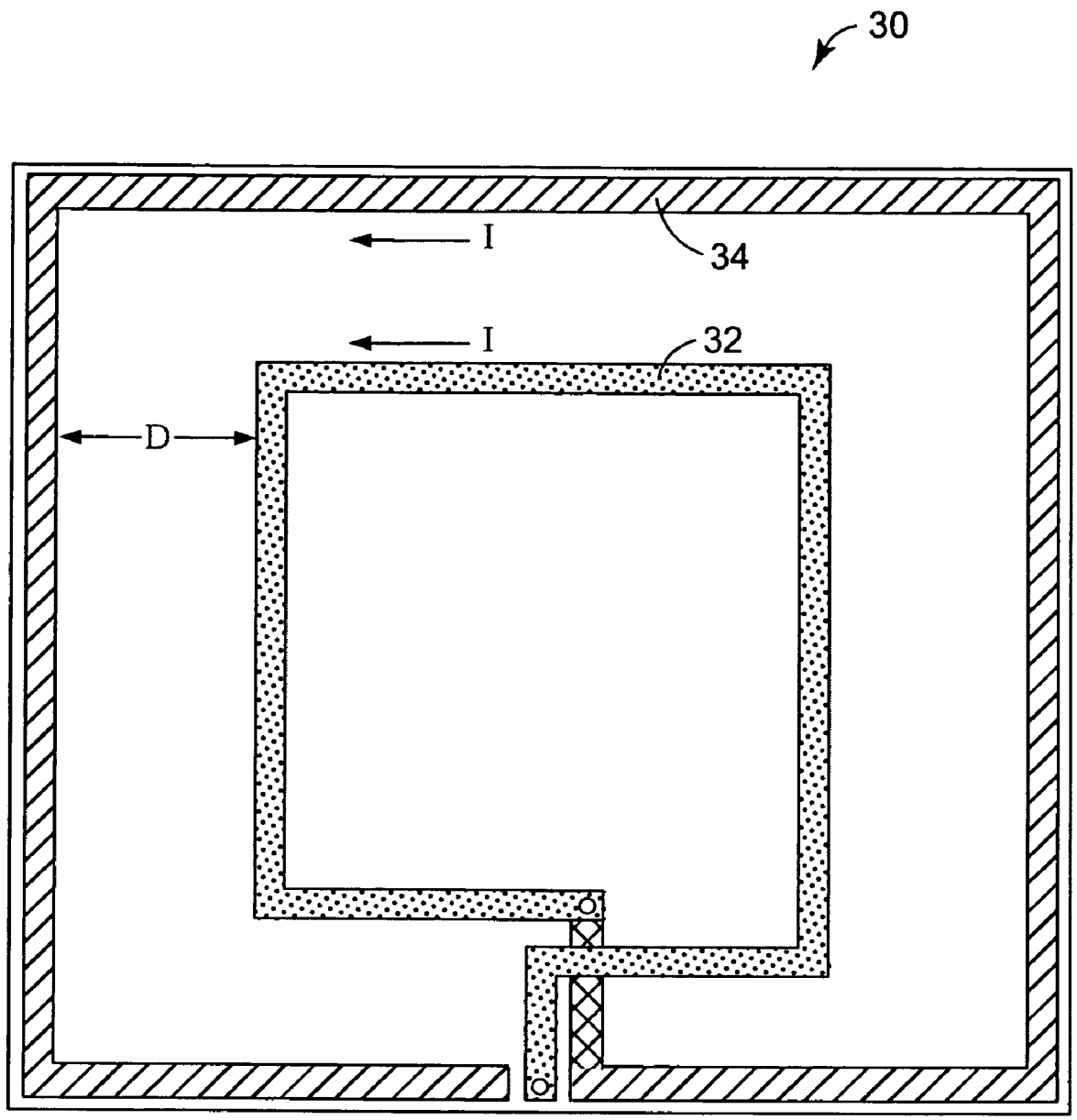
FIG. 3 is a plan view of an exemplary dual-loop antenna.

FIG. 3 is a plan view of an exemplary dual-loop antenna 30. In one exemplary embodiment, dual-loop antenna 30 includes an inner loop 32 and an outer loop 34 that reside on parallel layers of a printed circuit board. In another embodiment, inner loop 32 and outer loop 32 reside in a co-planar relationship.

Due to the configuration of dual-loop antenna 30, current (I) from reader 18 (FIGS. 1, 2) flows through each conductive edge of loops 32, 34 in the same direction. As a result, the electromagnetic fields created by the parallel conductive edges of loops 32, 34 are additive in nature and achieve a resultant field having an increased field size relative to a single loop antenna with equivalent power.

In addition, inner loop 32 and outer loop 34 are positioned and spaced so as to reduce the number and/or size of any potential holes within the resultant magnetic field. For example, unlike conventional single-loop antennas, reader 18 may be able to achieve successful communication with an RFID tag positioned directly above a conductive edge of the antenna. More specifically, in this situation a conventional single-loop RFID antenna may produce substantially equal current on opposite sides of the RFID tag, which leads to a cancellation effect. In contrast, an RFID tag centered above an edge of outer loop 34, for example, will achieve increased current on the inner side of the RFID tag due to inner loop 32. Similarly, an RFID tag centered above an edge of inner loop 32, for example, will achieve increased current on the outer side of the RFID tag due to outer loop 34. In either case, the increased current achieves increased energy within the RFID tag, allowing the RFID tag to successfully communicate with RFID reader 18. In this manner, the described configuration of dual-loop antenna 30 may reduce the number and/or size of any holes within the resultant electromagnetic field.

In one embodiment, inner loop 32 and outer loop 34 may be positioned at least a distance D apart, where D is selected based on a dimension of an RFID tag for use within the system. For example, sizes for many conventional 13.56 MHz RFID tags range in dimension from 0.5"×1"(1.27 cm×2.54 cm) to 2"×3"(5.08 cm×7.62 cm). Thus, in one embodiment D may be selected to exceed a maximum dimension of the RFID tag to ensure that no RFID tag can be positioned across both of inner loop 32 and outer loop 34, which may be advantageous in increasing the ability of reader 18 to achieve successful communication with the tags regardless of tag location. Consequently, in one embodiment $D \geqq 2.54$ cm. In another embodiment, $D \geqq 5.08$ cm.

Although illustrated for exemplary purposes with respect to generally rectangular dual-loops, other forms of loops may readily be used, such as round, oval or other geometric configurations.

Figure 4:
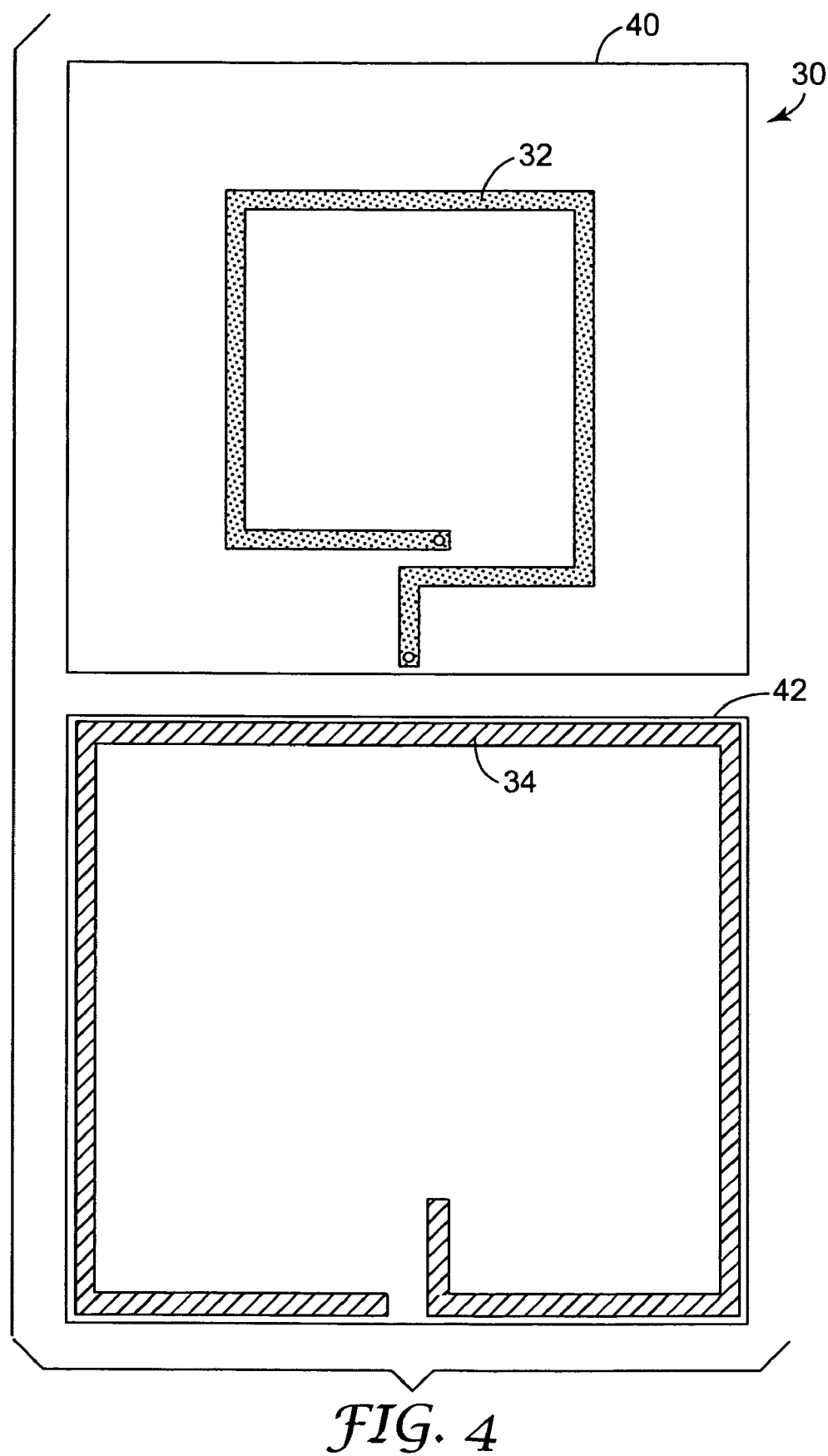
FIG. 4 is an exploded view of the dual-loop antenna of FIG. 3.

FIG. 4 is an exploded view of antenna 30 of FIG. 3. As described above, antenna 30 comprises a first layer 40 that contains inner loop 32 and a second layer 42 that contains outer loop 34. Layers 40, 42 may, for example, be layers stacked on top of one another to form a multi-layered printed circuit board.

Figure 5:
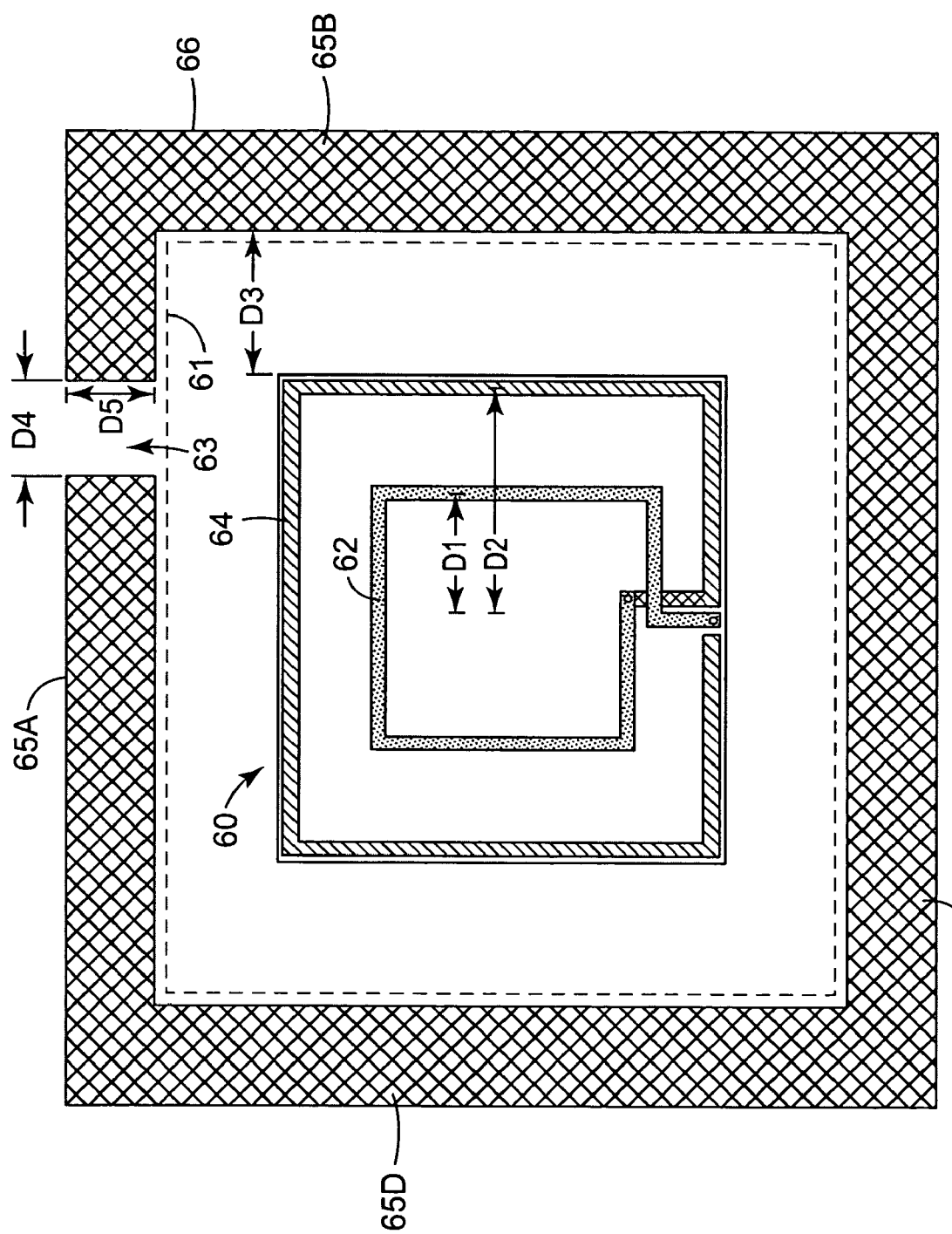
FIG. 5 is a schematic diagram illustrating a dual-loop antenna utilized in conjunction with a conductive shield to further refine and shape the resultant magnetic field.

FIG. 5 is a schematic diagram illustrating a dual-loop antenna 60 utilized in conjunction with a conductive shield 66 to further refine and shape the resultant magnetic field. Although illustrated for exemplary purposes with respect to a dual-loop antenna, conductive shield 66 may be used with other forms of antennas, such as single or multi-loop antennas of square, round or other configurations.

Conductive shield 66 may be viewed as four conductive planar regions 65A-65D that form a nearly contiguous conductive shield having a non-shielded inner region 61 around antenna 60. Conductive shield 66 prevents passage of an electromagnetic field, thereby limiting the magnetic field created by antenna 60 to the inner region. In other words, the magnetic field created by antenna 60 extends vertically (e.g., inward and outward from FIG. 6) within inner region 61, but is prevented from forming substantially over conductive shield 66 due to the conductive nature of the conductive shield.

Conductive shield 66 includes a disconnect area 63 that prevents a closed loop from being formed around antenna 60, thereby preventing current from forming within the conductive shield. In general, disconnect area 63 may have a gap of a minimum distance D4 sufficient to create an electrical disconnect within conductive shield 66 and not substantially reduce the shielding effect of the conductive shield. For example, conductive shield 66 may be conventional copper or other conductive shielding, and distance D4 need not be more than a few millimeters.

In general, conductive shield 66 is located a distance D3 from outer loop 64, and the distance D3 therefore defines the outer-most regions of the tag communication zone created by antenna 60. In other words, D3 defines the outermost limits of non-shielded inner region 61 in which the tags may be read when antenna 60 is driven with sufficient power to generate a magnetic field having sufficient strength to achieve successful communication throughout the inner region.

Each conductive regions 65A-65D has a width of D5, which generally is determined based on the strength of the magnetic field formed by antenna 60. For example, the width D5 of each conductive regions 65A-65D must be sufficient that the field strength at any region beyond, e.g., outside, of conductive shield 66 is below a threshold level necessary for RFID communication. In this manner, conductive shield 66 substantially prevents RFID communication in areas above conductive shield 66 until the field itself has reached a reduced field strength insufficient for RFID communication, which may be at any point between the inner edges and the outer edges of conductive regions 65. Consequently, D5 may be viewed as a minimum width of conductive regions 65, and the conductive regions may have greater widths. For example, conductive regions 65 may be extended beyond the distance D5 for other reasons, e.g., manufacturing simplicity. Moreover, conductive regions 65 need not be of uniform widths, but rather each should preferably exceed the minimum distance D5.

Figure 6:
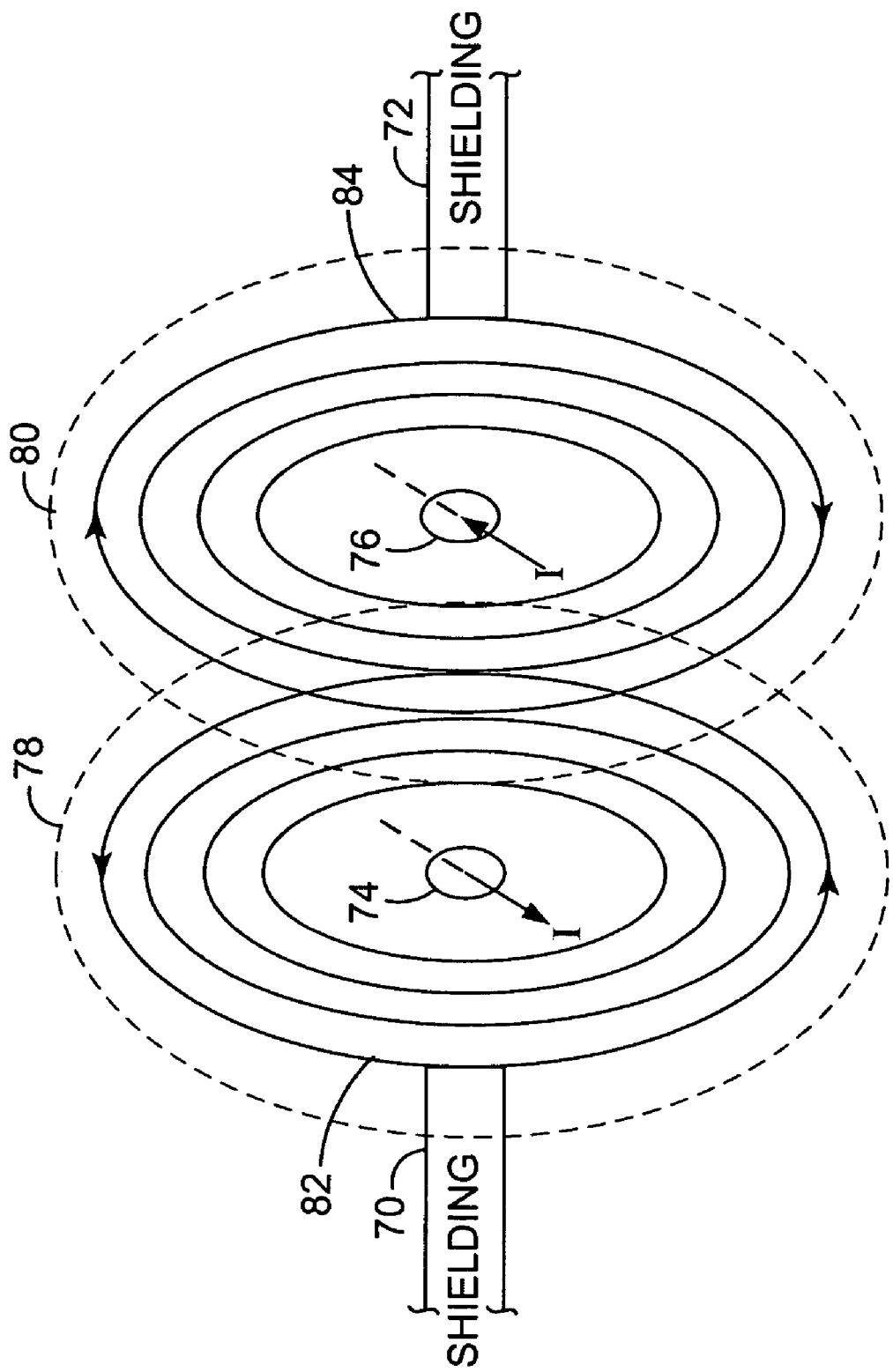
FIG. 6 is a side view perspective diagram illustrating exemplary effects on a magnetic field from a conductive shield on a single loop antenna.

FIG. 6 is a side view perspective diagram illustrating the effects on a magnetic field from a conductive shield for which a left portion 70 and a right portion 72 are depicted. For simplicity, a single-loop antenna is illustrated in FIG. 6 by conductive traces 74 and 76. It should be realized that with respect to the effects of a conductive shield, a dual-loop antenna may be logically viewed as a single loop antenna having a radius equal to an average between the radii associated with the dual loops.

As illustrated in FIG. 6, current I within conductive traces 74 and 76 create respective magnetic fields 82 and 84. Notably, magnetic fields 82, 84 would extend to regions 78, 80, respectively, but for the shielding affects of left portion 70 and right portion 72, respectively. Thus, it should be realized that locating left portion 70 and right portion 72 nearer to conductive traces 74 and 76 would further limit the outward extent to which the resultant magnetic field is formed. In addition, locating left portion 70 and right portion 72 nearer to conductive traces 74 and 76 would further limit the extent to with fields 82, 84 extend inward to the opposite conductive trace. The overall communication zone for this single loop antenna is the approximate sum of the magnetic fields 82 and 84.

For this reason, D3 (FIG. 5) is selected to exceed a minimum distance necessary for the magnetic fields 82, 84 (FIG. 6) to overlap so as to ensure that a field strength is achieved within the loops sufficient for RFID communication.

In one embodiment, for example, D3 is selected to approximately equal the average of D1 and D2 as follows:

$$D3 \geq (D1+D2)/2. \quad (1)$$

In addition, D2 is selected to equal approximately 1.5*D1. For example, D1, D2 and D3 may equal 2" (5.08 cm), 3.5" (8.89 cm), and 2.75" (6.98 cm) respectively. This particular selection for distance D3 allows the resultant magnetic field created by inner loop 62 and outer loop 64 (FIG. 5) to extend from these loops both in the inward and outward directions to entirely cover antennae 60 with sufficient strength to achieve RFID communication.

Figure 7:
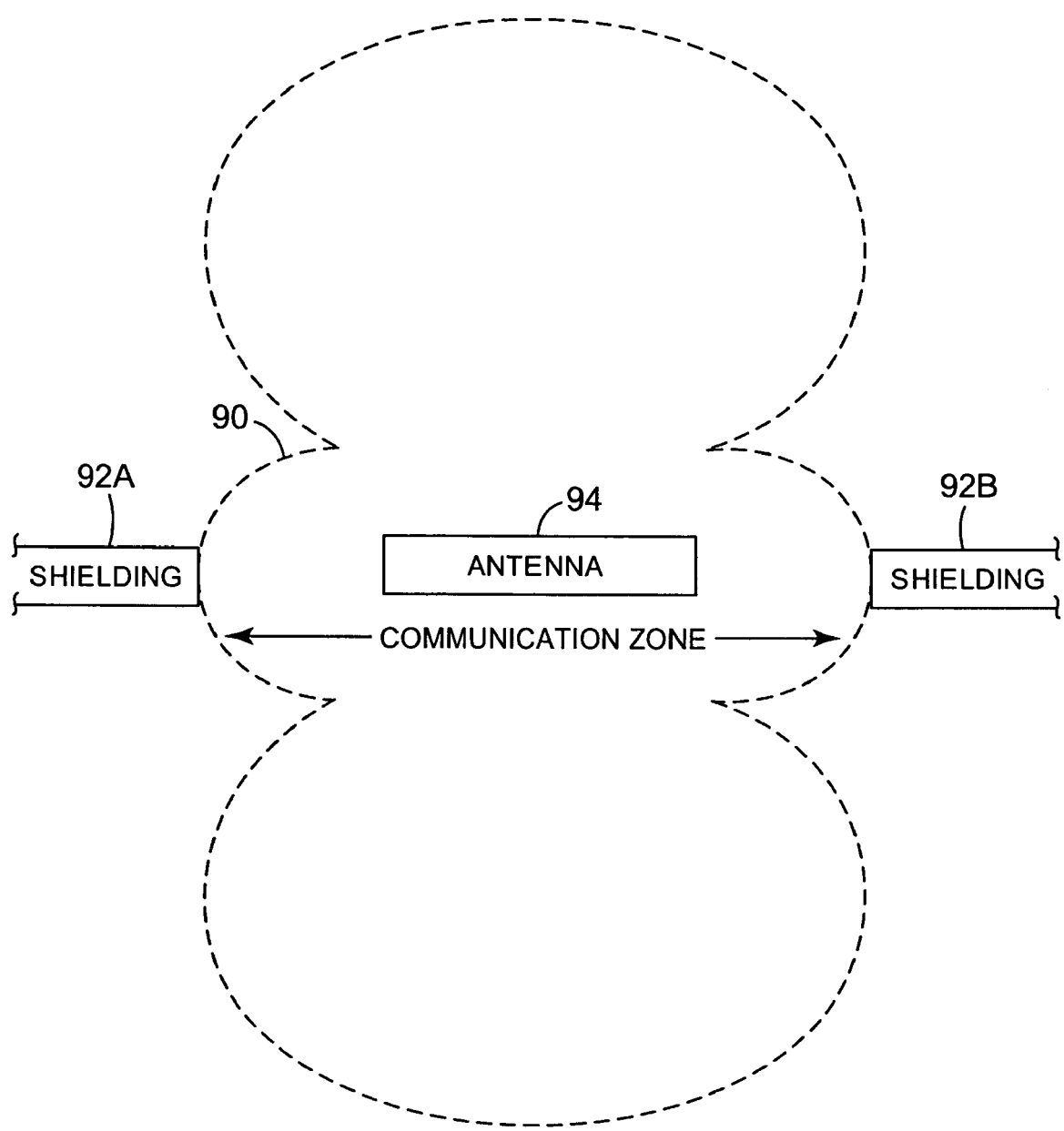
FIG. 7 is another side view perspective diagram illustrating exemplary field-shaping effects of a conductive shield.

FIG. 7 is another side view perspective diagram illustrating the field-shaping effects of a conductive shield. In particular FIG. 7 illustrates a resultant electromagnetic field 90 produced by antenna 94 and shaped by a conductive shield, of which a left portion 92A and a right portion 92B are depicted. As illustrated, the conductive shield limits the extent to which electromagnetic field 90 outwardly extends from antenna 94, thereby preventing inadvertent reading of RFID tags located beyond the horizontal edges of a defined communication zone.

Figure 8A:
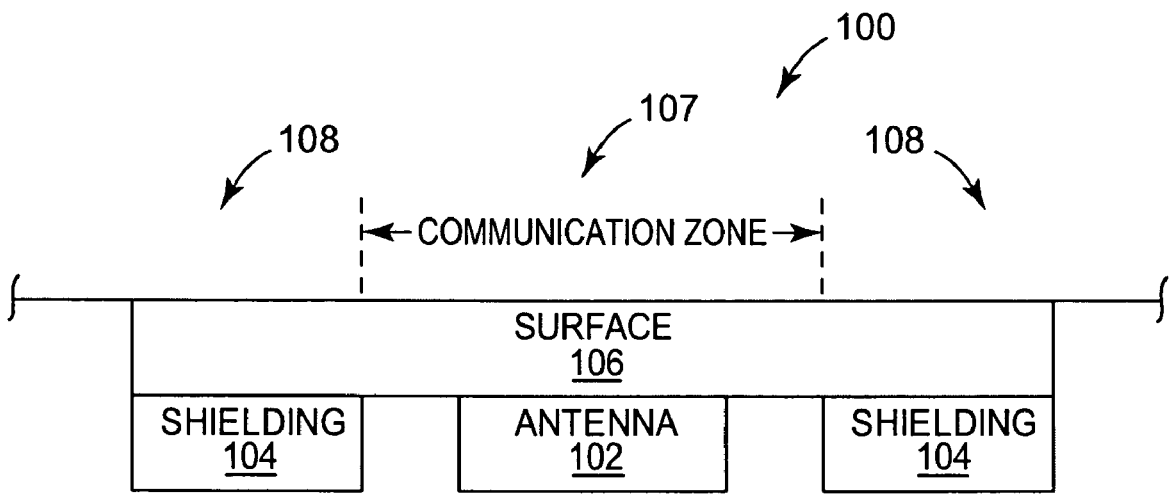
FIG. 8A is a perspective diagram illustrating a side views of an embodiment in which a conductive shield and an antenna are mounted below a working surface.

FIG. 8A is a perspective diagram illustrating a side view of one embodiment of a check-in/check-out area 100 in which an antenna 102 and conductive shield 104 are mounted below a surface 106. In this example, antenna 102 and conductive shield 104 create an RFID tag communication zone 107 above surface 106. Surface 106 may include visual indicia identifying the edges of the communication zone. In this manner, conductive shield 104 prevents inadvertent reading of RFID tags in areas 108 beyond the defined communication zone 107.

Figure 8B:
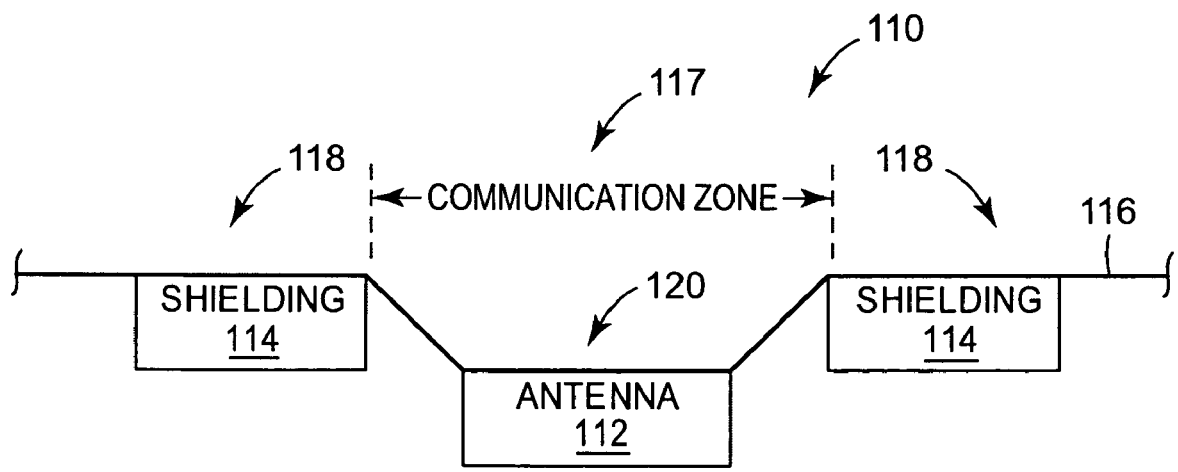
FIG. 8B is a perspective diagram illustrating a side views of an embodiment in which an antenna is mounted in a recessed portion of a working surface, and a conductive shield is mounted in a non-recessed portion of the working surface.

FIG. 8B is a perspective diagram illustrating a side view of another embodiment of a check-in/check-out area 110. In this example, desktop 116 forms a recess 120, below which antenna 112 is mounted. Conductive shield 114 is mounted to surround antenna 112, on the non-recessed portion of desktop 116. In this example, antenna 112 and conductive shield 114 create an RFID tag communication zone 117, and the conductive shield prevents inadvertent reading of RFID tags in areas 118 beyond the defined communication zone. In another embodiment, desktop 116 does not form recess 120, and antenna 112 is mounted below the desktop.

Various embodiments of the invention have been described. These and other embodiments are within the scope of the following claims.

The invention claimed is:

1. An antenna for interrogating radio frequency identification (RFID) tags having a maximum dimension M, the antenna comprising a plurality of conductive loops to produce an electromagnetic field for RFID communication with the RFID tags, wherein the conductive loops are spaced apart at least a distance D, wherein $D \geq M$.

2. The antenna of claim 1, wherein $D \geq 2.54$ cm.

3. The antenna of claim 1, wherein $D \geq 5.08$ cm.

4. The antenna of claim 1, wherein the plurality of conductive loops form a dual-loop structure having an inner loop and an outer loop.

5. The antenna of claim 1, wherein the plurality of conductive loops are electrically coupled so that a common current flows through the loops.

6. The antenna of claim 5, wherein the plurality of conductive loops are located in parallel planes and formed with concentric traces, and the plurality of conductive loops are electrically coupled so that the common current flows through the loops in the same direction.

7. The antenna of claim 1, wherein the plurality of conductive loops are formed in a single printed circuit board.

8. The antenna of claim 1, further comprising a tuning circuit for tuning the plurality of loops to a single operating frequency.

9. The antenna of claim 8, wherein the tuning circuit tunes the plurality of antennas to the operating frequency of approximately 13.56 megahertz (MHz).

10. The antenna of claim 1, wherein the conductive loops are substantially coplanar and the distance D represents the distance between the conductive loops within a plane.

11. A radio frequency identification (RFID) system comprising: an RFID tag associated with an article, wherein the RFID tag has a maximum dimension M; and
    an antenna having a plurality of conductive loops to produce an electromagnetic field for communication with the RFID tag, wherein the conductive loops are spaced at least a distance D, wherein $D \geq M$.

12. The RFID system of claim 11, further comprising:
    an RFID interrogation device coupled to the antenna, wherein the interrogation device interrogates the RFID tag to obtain information regarding the article; and
    a computing device to process the information retrieved from the RFID interrogation device.

13. The RFID system of claim 11, wherein the plurality of conductive loops are electrically coupled so that the RFID interrogation device, drives a common current through the loops.

14. The RFID system of claim 13, wherein the plurality of conductive loops are formed with concentric traces, and the plurality of conductive loops are electrically coupled so that the common current flows through the loops in the same direction.

15. The RFID system of claim 11, wherein $D \geq 2.54$ cm.

16. The RFID system of claim 11, wherein $D \geq 5.08$ cm.

17. The RFID system of claim 11, wherein the plurality of conductive loops form a dual-loop structure having an inner loop and an outer loop.

18. The RFID system of claim 11, wherein the antenna has a substantially planar form.

19. A radio frequency identification (RFID) system comprising:
    an RFID tag associated with an article, wherein the RFID tag has a dimension M;
    an antenna for interrogating RFID tags having a maximum dimension M, the antenna comprising a plurality of conductive loops to produce an electromagnetic field for RFID communication with the RFID tag, wherein the antenna has a substantially planar form, and wherein the conductive loops are spaced apart at least a distance D, wherein $D \geq M$; and a substantially-contiguous conductive shield positioned around the antenna and within a plane parallel to the antenna.

20. The RFID system of claim 19, wherein the conductive shield shapes the electromagnetic field to extend substantially in a direction perpendicular to the antenna, and prevents the electromagnetic field from forming substantially over the conductive shield.

21. The RFID system of claim 20, wherein the conductive shield comprises planar conductive regions oriented to form a non-shielded inner region, and further wherein the antenna is disposed within the non-shielded inner region and parallel to the planar conductive regions.

22. A method comprising:
determining a maximum dimension M of a radio frequency identification (RFID) tag for use within a radio frequency identification (RFID) system;
selecting a distance D based on the dimension M, wherein $D \geq M$; and
positioning a plurality of conductive loops of an antenna such that the conductive loops are spaced apart at least the selected distance D for communication with the RFID tag within the RFID system.

23. The method of claim 22, further comprising electrically coupling the plurality of conductive loops so that a common current flows through the loops.

24. The method of claim 23,
wherein the plurality of conductive loops are located in parallel planes and formed with concentric traces, and
wherein electrically coupling the plurality of conductive loops comprises electrically coupling the plurality of conductive loops so that the common current flows through the loops in the same direction.

25. The method of claim 22, further comprising forming the conductive loops in a single printed circuit board.

26. The method of claim 22, further comprising tuning the plurality of loops to a single operating frequency using a tuning circuit.

27. The method of claim 22, wherein positioning the conductive loops comprises positioning the loops substantially coplanar, and wherein the distance D represents the distance between the conductive loops within a plane.

28. The method of claim 22, further comprising positioning a substantially-contiguous conductive shield around the antenna and within a plane parallel to the antenna.

29. The method of claim 28, further comprising:
shaping the electromagnetic field to extend substantially in a direction perpendicular to the antenna; and preventing the electromagnetic field from forming substantially over the conductive shield.

* * * * *

UNITED STATES PATENT AND TRADEMARK OFFICE
CERTIFICATE OF CORRECTION

PATENT NO. : 7,417,599 B2 Page 1 of 1
APPLICATION NO. : 10/784124
DATED : August 26, 2008
INVENTOR(S) : Edward D. Goff It is certified that error appears in the above-identified patent and that said Letters Patent is hereby corrected as shown below:

Column 8
Line 47, In Claim 13, delete "device," and insert -- device --, therefor.

Signed and Sealed this

Eighth Day of December, 2009

David J. Kappos
*Director of the United States Patent and Trademark Office*